(12) United States Patent
Mietzner, Jr.

(10) Patent No.: US 10,913,639 B2
(45) Date of Patent: Feb. 9, 2021

(54) BOOM SAFE ANTI-TIP SYSTEM

(71) Applicant: LeRoy W. Mietzner, Jr., Sammamish, WA (US)

(72) Inventor: LeRoy W. Mietzner, Jr., Sammamish, WA (US)

( * ) Notice: Subject to any disclaimer, the term of this patent is extended or adjusted under 35 U.S.C. 154(b) by 167 days.

(21) Appl. No.: 15/889,696

(22) Filed: Feb. 6, 2018

(65) Prior Publication Data

US 2018/0222728 A1 Aug. 9, 2018

Related U.S. Application Data

(60) Provisional application No. 62/455,203, filed on Feb. 6, 2017.

(51) Int. Cl.
*B66C 13/16* (2006.01)
*B66C 13/18* (2006.01)
(Continued)

(52) U.S. Cl.
CPC .............. *B66C 13/16* (2013.01); *B66C 13/18* (2013.01); *B66C 13/46* (2013.01); *B66C 15/065* (2013.01);
(Continued)

(58) Field of Classification Search
CPC ....... B66C 13/18; B66C 23/90; B66C 23/905; B66C 2700/065; B66C 23/701; B66C 13/16; B66C 13/46; B66C 23/06; B66C 13/12; B66C 23/00; B66C 23/88; B66C 13/00; G01L 1/22; G01L 5/0071
See application file for complete search history.

(56) References Cited

U.S. PATENT DOCUMENTS 3,679,179 A * 7/1972 Praddaude .............. B66C 13/18
254/93 R
4,126,868 A * 11/1978 Kirner ........................ B41J 2/19
347/86
(Continued)

FOREIGN PATENT DOCUMENTS

GB 901410 7/1962

OTHER PUBLICATIONS

Boom-Safe Anti-Tip system from DBL Engineering LLC (Year: 2019).*

*Primary Examiner* — Orlando E Aviles
*Assistant Examiner* — Mahdi H Nejad
(74) *Attorney, Agent, or Firm* — Dean A. Craine, P.S

(57) ABSTRACT

An anti-tip system for a lifting machine that includes a boom pivotally attached to a boom pivot joint, boom supporting member that raises or lowers the boom with a load attached to the boom, and a boom supporting member that supports, and transfers forces exerted on the boom to the lift machine's chassis. The system includes a bracket attached to the chassis that includes at least one guide arm and at least one force arm. The guide and force arms are pivotally attached at their proximal ends to the bracket's base and their distal ends converge and pivotally coupled at a common pivot joint that also pivotally connects to the boom supporting member. The longitudinal axes of the guide and force arms are perpendicularly aligned. When assembled, the extended longitudinal axis of the guide arm passes through the boom pivot joint. A strain gauge is attached to the force arm that measures the force exerted on the force arm.

9 Claims, 11 Drawing Sheets

(51) Int. Cl.
- *B66C 23/70* (2006.01)
- *B66C 23/90* (2006.01)
- *B66C 23/06* (2006.01)
- *G01L 5/00* (2006.01)
- *G01L 1/22* (2006.01)
- *B66C 15/06* (2006.01)
- *B66C 13/46* (2006.01)

(52) U.S. Cl.
CPC ............ *B66C 23/06* (2013.01); *B66C 23/701* (2013.01); *B66C 23/905* (2013.01); *G01L 1/22* (2013.01); *G01L 5/0071* (2013.01)

(56) References Cited

U.S. PATENT DOCUMENTS

| | | |
|---|---|---|
| 4,687,406 A | 8/1987 | Kinsey |
| 4,743,893 A | 5/1988 | Gentile et al. |
| 4,858,475 A | 8/1989 | Jacobson et al. |
| 4,944,364 A | 7/1990 | Blasko |
| 5,054,989 A | 10/1991 | Fell |
| 5,160,055 A | 11/1992 | Gray |
| 5,538,149 A * | 7/1996 | Martin .................... B66C 23/54 212/270 |
| 6,032,094 A | 2/2000 | Yangagi et al. |
| 6,250,485 B1 | 6/2001 | Olson |
| 6,523,221 B1 * | 2/2003 | Dahlin ..................... B08B 5/04 15/304 |
| 6,536,615 B2 | 3/2003 | Nishikino |
| 6,991,119 B2 | 1/2006 | Puszkiewicz et al. |
| 8,950,605 B2 | 2/2015 | Jene |
| 9,073,739 B2 | 7/2015 | Woods et al. |
| 9,079,756 B2 | 7/2015 | Beji |
| 9,082,288 B2 | 7/2015 | Wei et al. |
| 9,249,004 B2 | 2/2016 | Bowden |
| 2003/0173324 A1 | 9/2003 | Puszkiewicz |
| 2017/0089044 A1 * | 3/2017 | Chitty .................... E02F 9/267 |

* cited by examiner

BOOM SAFE ANTI-TIP SYSTEM

This non-provisional patent application is based on and claims the filing date benefit of U.S. provisional patent application (Application No. 62/455,203) filed on Feb. 6, 2017.

Notice is given this patent document contains original material subject to copyright protection. The copyright owner has no objection to the facsimile or digital download reproduction of all or part of the patent document, but otherwise reserves all copyrights.

BACKGROUND OF THE INVENTION

1. Field of the Invention

This invention pertains to lifting machines, and more particularly, to gauges or indicators that inform an operator when the maximum lifting capacity of the lifting machine is being approached.

2. Description of the Related Art

Cranes and other types of articulated lifting machines lift and support a-heavy load loads by applying the principle of leverage. The weight of the lifting machine, the location of the machine's tipping point, and its attachment to the ground are balanced against the size, shape, and weight of the load being lifted.

When lifting a load, the distance from the load's center of gravity to the lifting machine's tipping point changes as the boom angle changes, as the boom length changes and as the boom swings. The lifting operator must monitor these three movements for safe operation.

Increasing or decreasing the length of the boom, increases and decreases the distance from the machine's tipping point to the load's center of gravity. When the distance is increased, the lifting capacity is decreased. When the distance is decreased, the lifting capacity is increased.

Decreasing or increasing the angle of the boom also decreases or increases, respectively, the lifting machine's lifting capacity. When the angle is decreased, the distance from the machine's tipping point to the load's center of gravity is increased and the lifting capacity is decreased. When the angle is increased, the distance from the machine's tipping point to the load's center of gravity is decreased and the lifting capacity is increased.

Some lifting machines include a telescopically extendible boom pivotally attached to the lifting machine's chassis, and a telescopic actuator extending between the chassis and the boom. As the length of the actuator changes, the angle of the boom relative to the chassis increases or decreases. On many lifting machines the judgement of the operator is used to determine if a load can be safely lifted when the boom is moved to a particular length and angle. Complicating the operator's judgment is that the angle of the boom alters the lifting machine's resisting moment.

SUMMARY OF THE INVENTION

Disclosed herein is an anti-tip system used with a lifting machine with a pivot boom that directly measures the lifting machine's tipping moment during operation. The lifting machine includes a chassis and a boom attached at its proximal end to the chassis via a boom pivot joint. Attached to the boom is a boom supporting member that transfers forces applied to the distal end of the boom to the chassis. The system includes a load-sensing means attached between the chassis and the boom supporting member. The load-sensing means includes at least one guide arm and at least one force arm. The guide arm and the force arm are pivotally attached at their proximal ends to a base mounted on the chassis. The guide arm and force arm extend outward from the base and converge and are pivotally coupled together at their distal ends at a common pivot joint. In the embodiment shown, the common pivot joint is a single axle. The axle is attached to a pivoting coupler or yoke attached to the proximal end of the boom supporting member that couples the boom supporting member to the bracket. In one embodiment, the load supporting member is a hydraulic actuator configured to generate a lifting force to the boom. By controlling the operation of the hydraulic actuator, the boom can be lowered and raised about the boom pivot joint. Forces generated in the hydraulic actuator are transmitted to the coupler or yoke and into the force arm and the guide arms.

In the embodiment shown, two guide arms are pivotally attached to the base and one force arm is pivotally attached to the base. The two guide arms and force arm are rigid and have a fixed length. The longitudinal axes of the two guide arms and the longitudinal axis of the force arm converge on one side of the base. The distal ends of the two guide arms and force arm are pivotally connected at the common pivot joint. The guide arms are aligned on the base so a line extending from the longitudinal axis of each guide arm passes through the transverse axis on the boom pivot joint.

Attached to the force arm is a strain gauge that measures the force exerted on the force arm by the boom supporting member during operation. In one embodiment, the strain gauge is connected to a printed circuit board with a microprocessor. A load calculation software program is loaded into the working memory of the microprocessor that transforms readings from the strain gauge into load readings then communicated to the operator. The output data from the microprocessor may be used by the boom's length and the boom's angle control systems so the lifting machine boom automatically stays within safe operating limits.

During operation, a load is applied to the distal end of the boom and transferred to the boom supporting member. When the distal end of the boom is lowered and raised, the angle of the boom changes. Because the boom is coupled at its proximal end to the force arm via the boom support member, load forces exerted on the boom are automatically transferred through the boom supporting member and to the force arm and the guide arms via the common pivot joint and then detected by the strain gauge. Because the force arm is oriented perpendicular to the line (i.e. the longitudinal axes of the guide arms) that extends from the boom pivot joint to the common pivot joint, the forces detected by the strain gauge are proportional to the tipping moment acting on the chassis.

Because the strain gauge is constantly monitoring the load forces on the force arm, outside forces, such as wind or earth movements that cause the boom to move, counter movements to the boom may be made to offset these outside forces.

DESCRIPTION OF THE PREFERRED EMBODIMENT(S)

Figure 1:
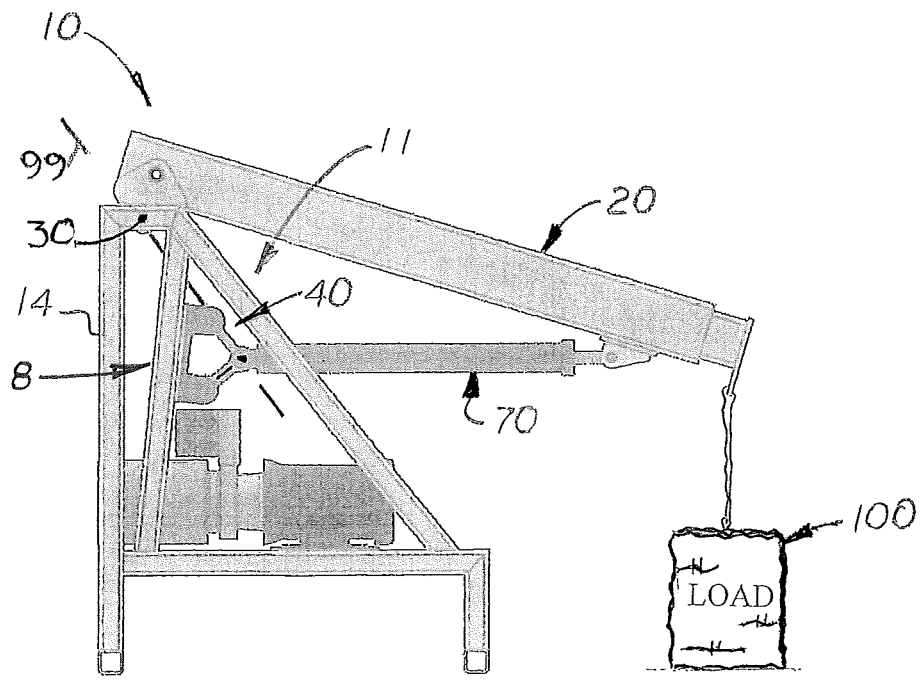
FIG. 1 is a side elevational view of a lifting machine with a pivotally attached, telescopic boom attached to a load resting on the ground.
Figure 2:
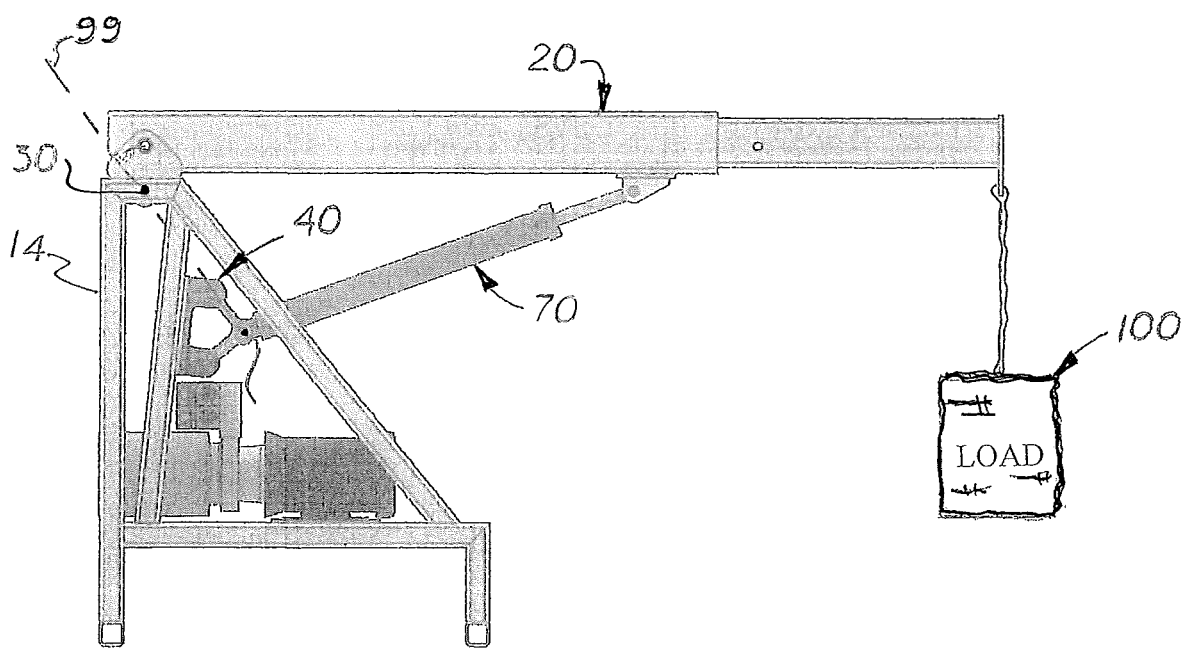
FIG. 2 is a side elevational view of a lifting machine in FIG. 1 with the boom partially extended and attached to a load and lifted off the ground.
Figure 3:
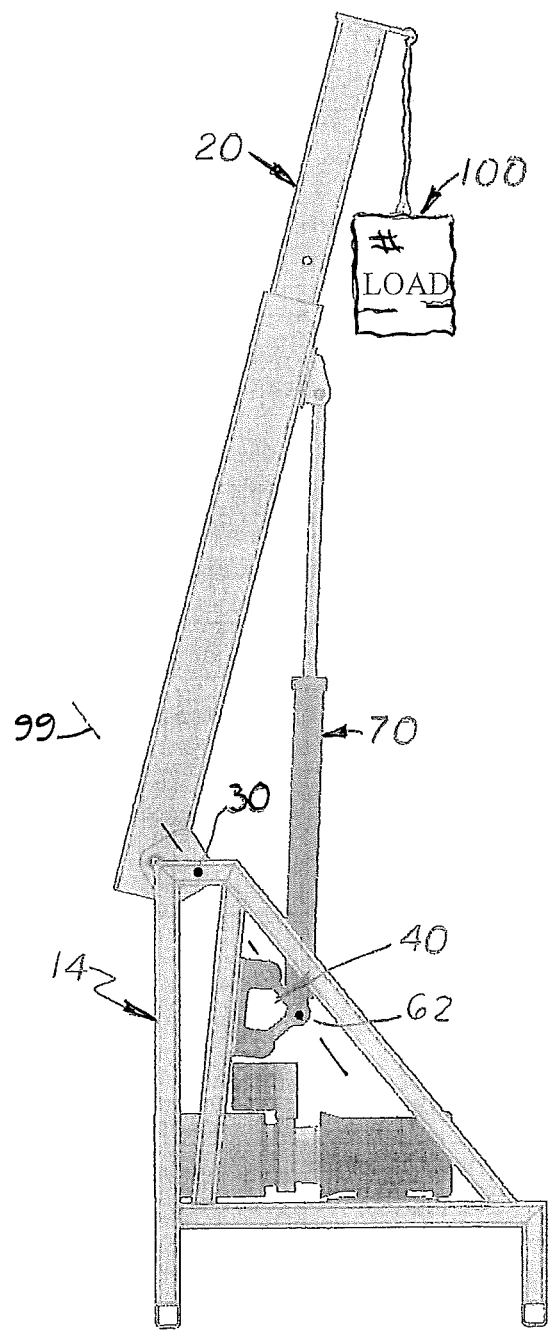
FIG. 3 is a side elevational view of the lifting machine shown in FIGS. 1 and 2 with the boom extended and attached to a load lifted upward over the lifting machine.
Figure 4:
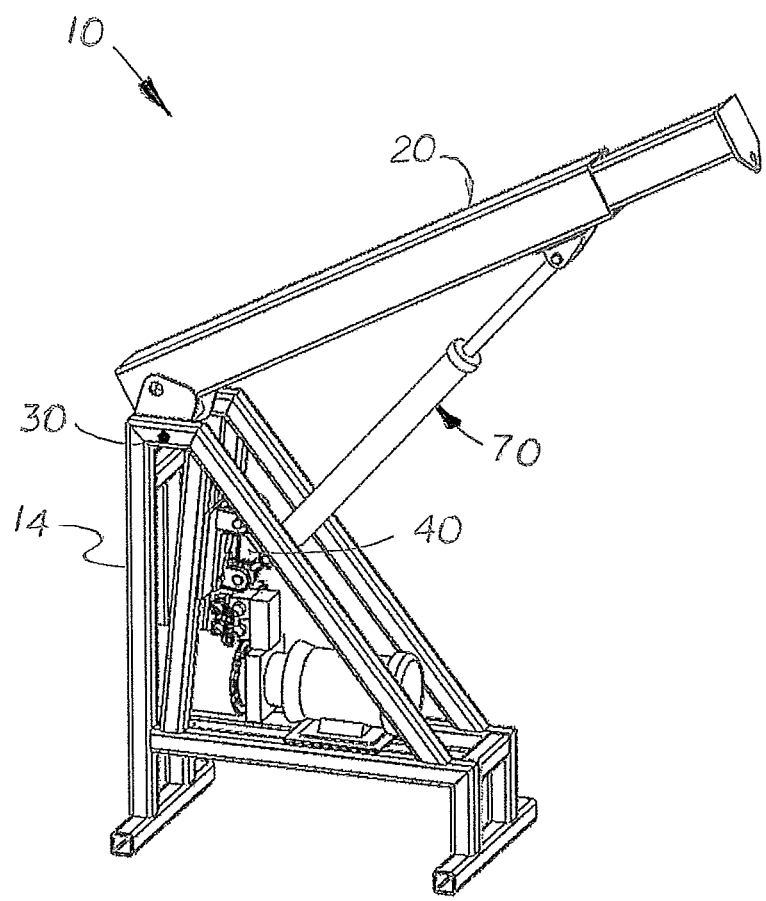
FIG. 4 is a perspective view of the lifting machine with the boom partially extended by an actuator attached at one end to the device.
Figure 5:
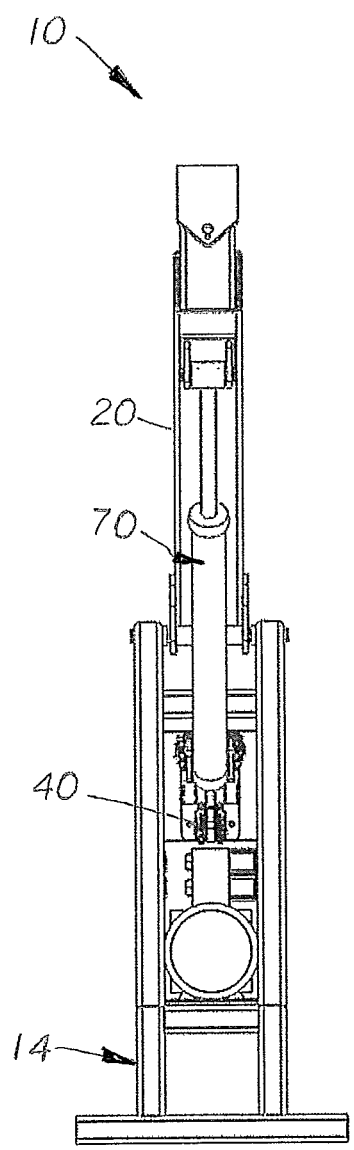
FIG. 5 is a front elevational view of the lifting machine with the boom partially extended by an actuator attached at one end to the device.

Disclosed herein is an anti-tip system 8 for a lifting machine 10 that includes a chassis 14, a boom 20 pivotally attached at one end to the chassis 14 via a boom pivot joint 30. Pivotally attached to the boom 20 near its opposite distal end is a boom supporting member 70 that continuous receives forces exerted on the distal end of the boom 20 when the angle of the boom 20 relative to the chassis 14 changes.

Figure 6:
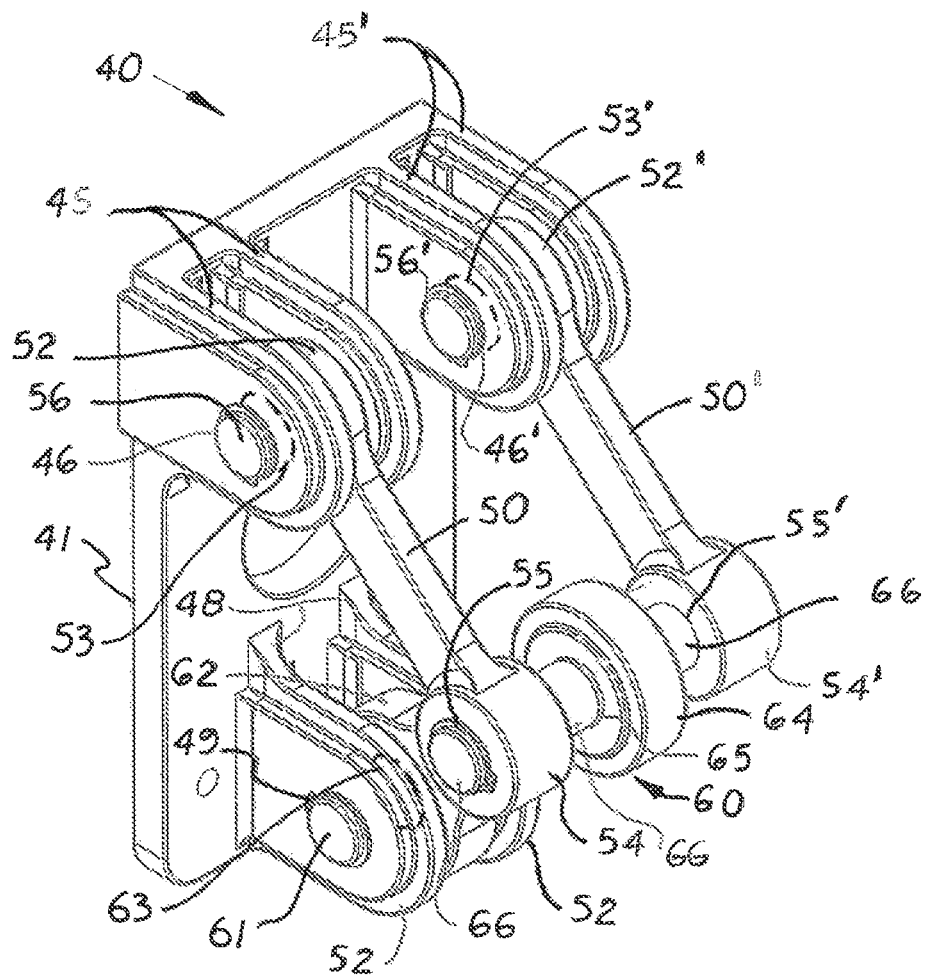
FIG. 6 is a front perspective view of the lifting bracket.
Figure 7:
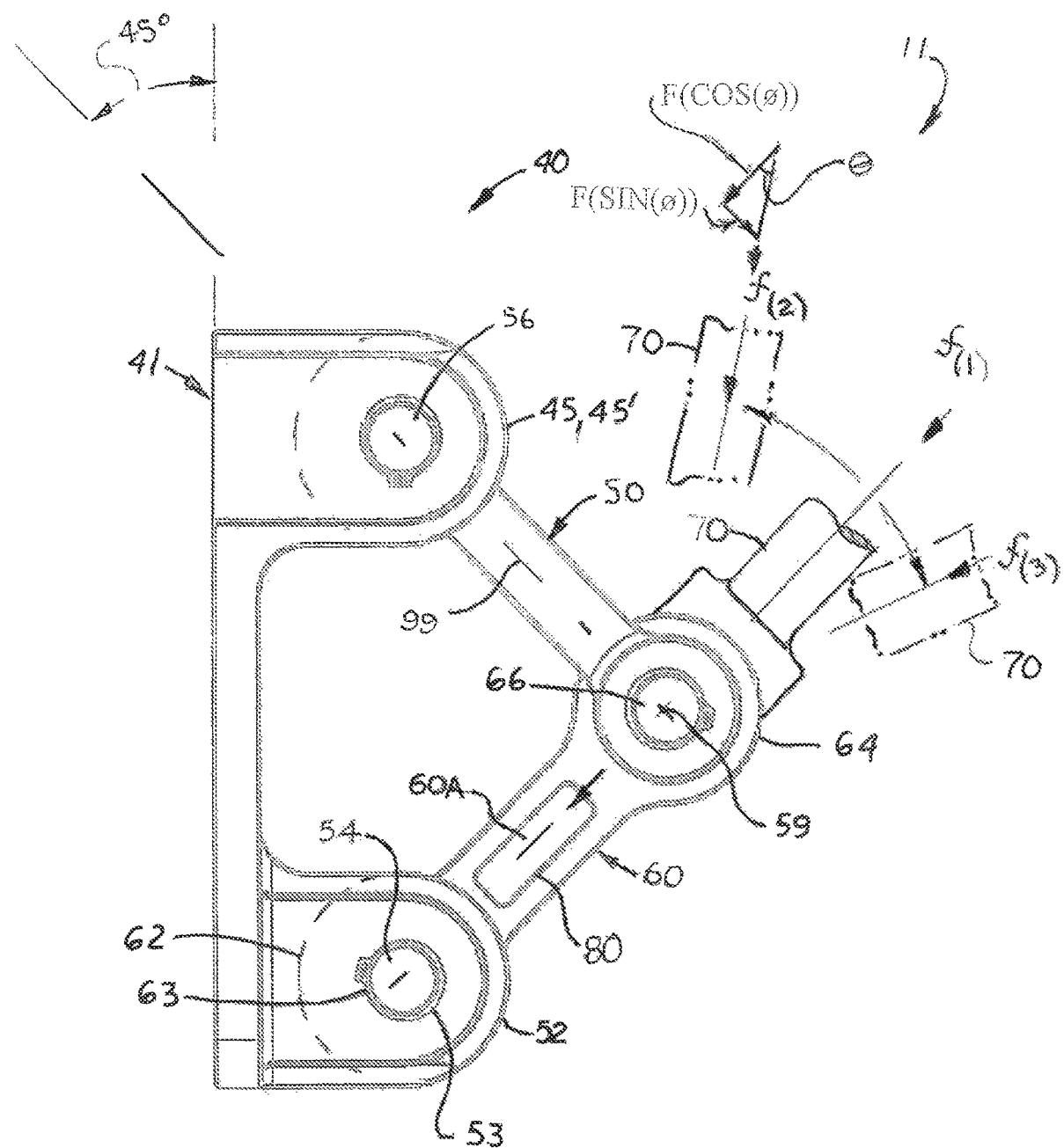
FIG. 7 is a side elevational view of the lifting bracket which also shows the boom supporting member being rotated around the common pivot joint generating different forces transferred to the force arm and detected by the strain gauge.
Figure 8:
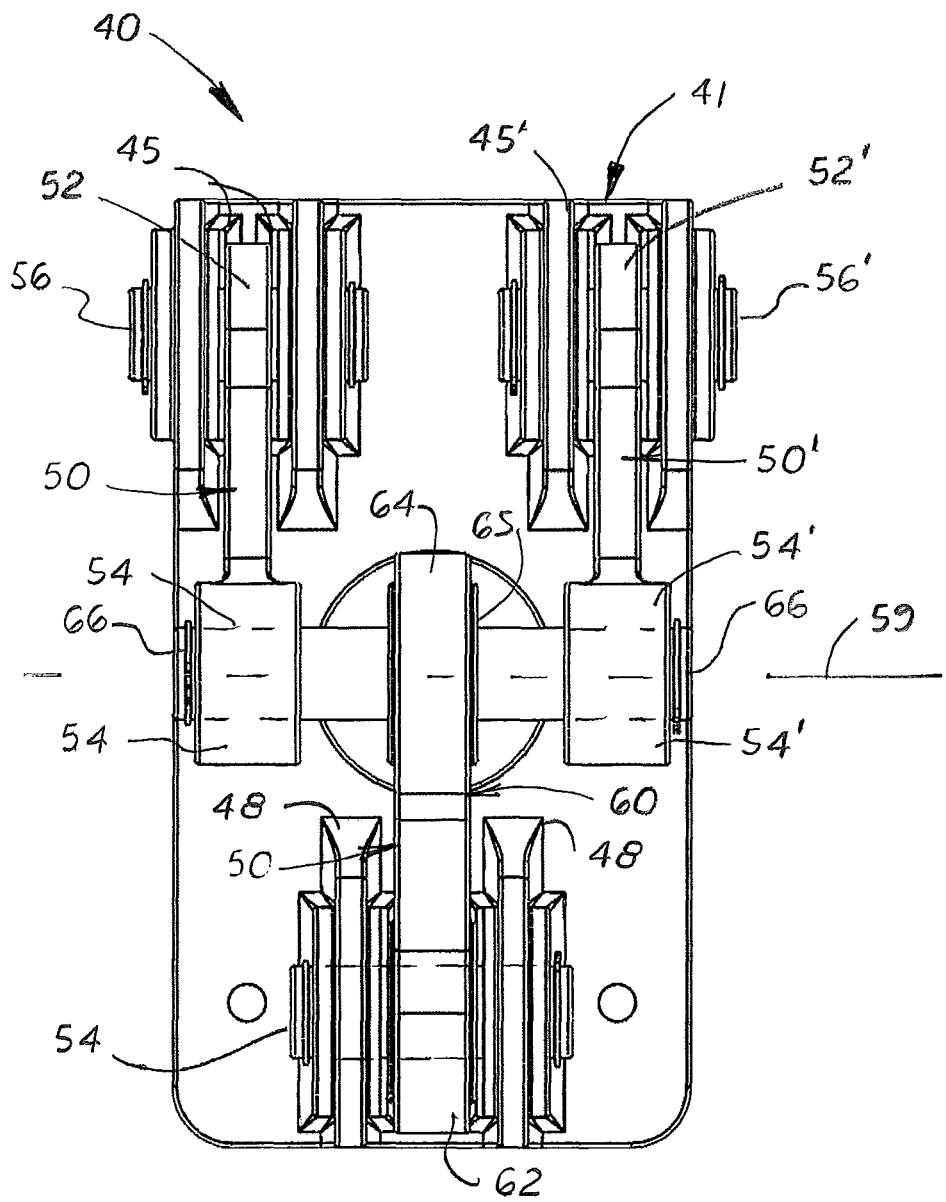
FIG. 8 is a front elevational view of the lifting bracket.
Figure 9:
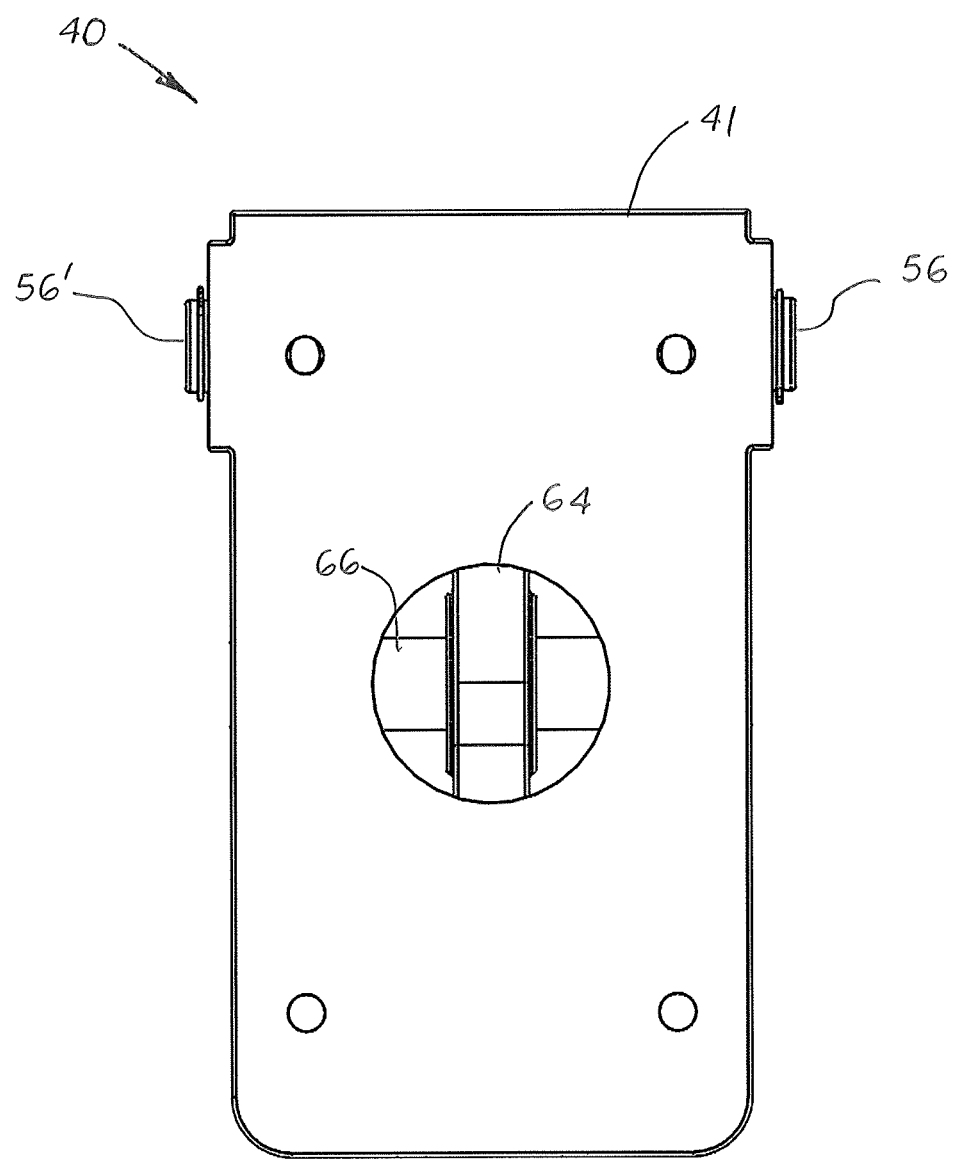
FIG. 9 is a rear elevational view of the lifting bracket.
Figure 10:
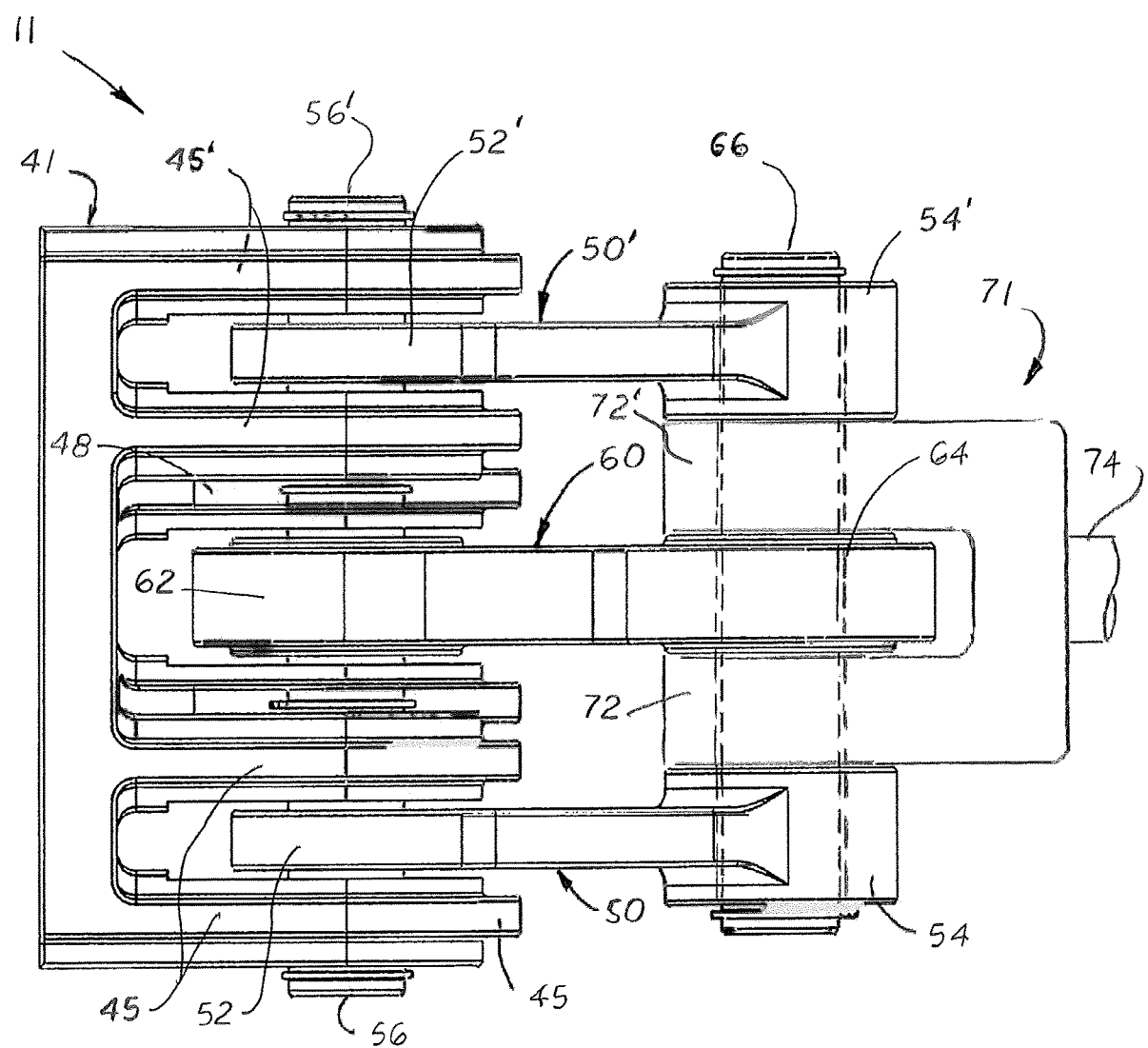
FIG. 10 is a top plan view of view of the lifting bracket and showing the yoke attached to the common point joint.
Figure 11:
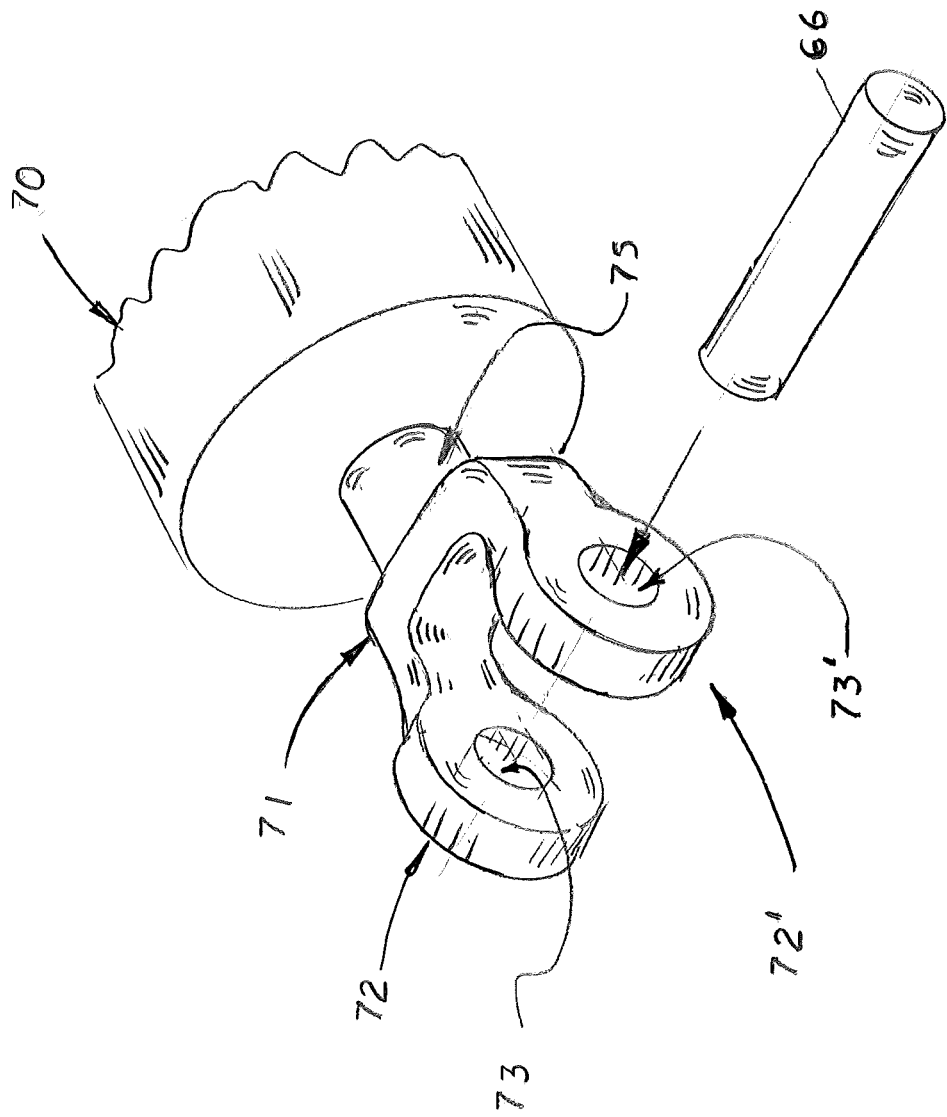
FIG. 11 is a partial perspective view of the yoke attached to the boom supporting member and showing the rod extending through the ears formed on the yoke.
Figure 12:
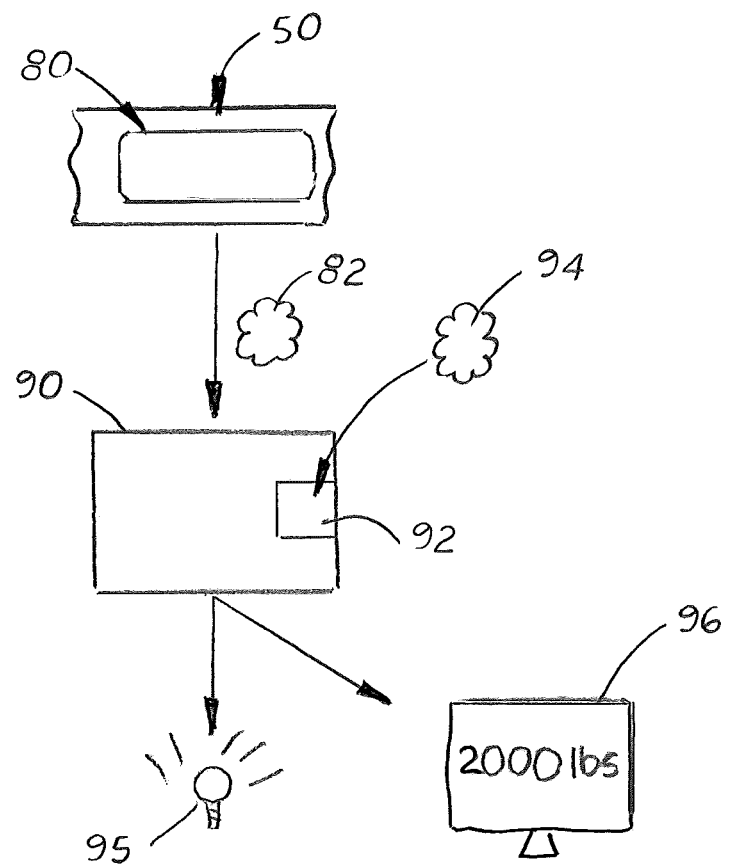
FIG. 12 is a diagram showing a strain gauge attached to the force arm and connected to a printed circuit board with a microprocessor and software program.

The system 10 includes a lifting bracket 40 attached to the chassis 14. The lifting bracket 40 shown more clearly in FIGS. 6-10, includes a base 41 and two guide arms 50, 50' and at least one force arm 60. Each guide arm 50, 50' is attached to a pair of ears 45, 45', respectively, that extend perpendicular outward from the base 41. Holes 46, 46' are formed on each ear 45, 45', respectively. Located centrally on the base 41 and below the two pairs of ears 45, 45' is a single pair of ears 48 used with the force arm 60. Holes 49 are formed on each ear 48.

Each guide arm 50, 50' is a rigid bar or rod that includes a proximal end 52, 52' and a distal end 54, 54', respectively. Formed on each end 52, 52' and 54, 54' is a hole 53, 53' and 55, 55', respectively. Two first axles 56, 56' extends transversely through the holes 46, 46', 53 and 53' and 55, 55' to pivotally attach the proximal ends 52, 52' of the two guide arms 50, 50' to the two ears 45, 45', respectively.

The force arm 60 is a rigid bar or rod attached to one pair of ears 48 that extend perpendicular from the base 41. Each ear 48 includes a hole 49. The ears 48 are below and centrally aligned between the two ears 45, 45'. The force arm 60 includes a proximal end 62 and a distal end 64. Formed on the proximal end 62 is a hole 63. Formed on the distal end 64 is a hole 65. Extending through the two holes 49, 63 is a second axle 61.

Formed on the distal end 54, 54' ends of each guide arm 50, 50" and on the distal end 64 of the force arm 60 are holes 55, 55' and 65, respectively. The two guide arms 50, 50' and the one force arm 60 extend outward from the base 41 and converge and are pivotally coupled together at their distal ends 54, 54' and 64 to a third axle 66 and forming a common pivot joint 59. Pivotally coupled to the distal ends 54, 54' of the two guide arms 50, 50' and the distal end 64 of the force arm 60 is a pivoting coupler or yoke 71 formed or attached to the boom supporting member 70.

In one embodiment, the boom supporting member 70 is also a force exerting component, such as a hydraulic actuator, that exerts force on the boom 20 causing it to rotate around the boom pivot joint 30. The hydraulic actuator supports the boom 20 when lifting a load 100. The hydraulic actuator includes a piston 75 attached or integrally formed the yoke 71. The yoke 71 includes to two ears 72, 72' with holes 73, 73' formed that receive the third axle 66.

It should be understood, however, that the boom supporting arm 70 could be a winch and that yoke 71 could be modified for use with a winch.

The two arms 50, 50' and the force arm 60 have a fixed length and configured so their longitudinal axes 50A, 50A', 60A, respectively, are always perpendicularly oriented and form a right angle. The longitudinally axis 50A, 50A' of each guide arm 50, 50', respectively, when extended passes through the transverse axis of the common pivoting joint 59. In one embodiment, the extended longitudinal axes 99 pass through or near (within 1 to 3 inches) of the center point to the boom pivot joint 30.

Attached to the force arm 60 is a strain gauge 80 that measures the force exerted on the force arm 60 by the boom supporting member 70. Different strain gauges 80 may be used. A typical strain gauge measures resistance as it varies with applied force. They typically comprise an insulated flexible backing which supports a metallic foil pattern. Other strain gauges may be used if they measure strain on the force arm 60.

In one embodiment, the strain gauge 80 is connected to a printed circuit board 90 with a microprocessor 92 in which a load calculation software program 94 is loaded into its working memory. The load software program 94 calculates readings 82 from the strain gauge 80 and converts the readings 82 into a load reading 94. The load reading 94 are then presented to an operator or coupled to an audible or visual indicator.

During operation, a load 100 is attached to the distal end of the boom 20. The boom supporting member 70 raises and lowers the distal end of the boom 20 and the load 100. Because the yoke 71 is pivotally coupled to the distal ends 54, 54' of the two guide arms 50, 50' and to the force arm 60, inward forces exerted on the yoke 71 are transferred to the guide arms 50, 50' and to the force arm 60. Because the force arm 60 is oriented perpendicular to the line 99 that extends from the boom pivot joint 30 to the common point joint 59, the strain gauge 80 measures that force exerted on the yoke 71 that directly supports the weight of the boom 20 and the load 100. The load 100 being measured is, therefore, directly proportional to the tipping moment acting on the base 41 and chassis 14 by way of the boom 20 lifting the load 100.

In compliance with the statute, the invention described has been described in language more or less specific on structural features. It should be understood however, that the invention is not limited to the specific features shown, since the means and construction shown, comprises the preferred embodiments for putting the invention into effect. The invention is therefore claimed in its forms or modifications within the legitimate and valid scope of the amended claims, appropriately interpreted under the doctrine of equivalents.

I claim:

1. An anti-tip system for a lifting machine that includes a chassis, a boom pivotally connected to the chassis at a boom pivot joint, and a boom supporting member; wherein a distal end of the boom supporting member is pivotally attached to the boom; the system comprising:
   a. lifting bracket attached to said chassis, said lifting bracket includes a base and at least one guide arm pivotally attached to said base and at least one force arm pivotally attached to said base, each said at least one guide arm and said at least one force arm includes a distal end and a longitudinal axis, said at least one guide arm and said at least one force arm being aligned on said base so their distal ends are pivotally connected to form a common pivot joint and their longitudinal axes are perpendicularly aligned, said at least one guide arm being oriented on said chassis so said longitudinal axis of said at least one guide arm when extended passes through the boom pivot joint;
   b. a strain gauge coupled to said at least one force arm configured to measure stress exerted on said at least one force arm by said boom supporting member;
   c. a printed circuit board with a microprocessor, said printed circuit board connected to said strain gauge; and
   d. a software program loaded into said microprocessor configured to calculate the load forces exerted on said boom when lifting a load.

2. The system, as recited in claim 1, further including a yoke connected to said boom supporting member and pivotally connected to said common pivot joint, said yoke configured to transmit said load forces exerted on said boom supporting member to said common pivot joint.

3. The system, as recited in claim 1, wherein said at least one guide arm includes two guide arms pivotally connected to said base.

4. The system, as recited in claim 1, wherein said software program is configured to provide a visual or audible signal when the reading from the strain gauge equals or exceeds a maximum lift capacity.

5. A force indicating lifting bracket for a lifting machine with a chassis, a boom attached to the chassis via a boom pivot joint, and a boom supporting member configured to lower or raise the boom; the lifting bracket comprising:
   a. a base;
   b. at least one guide arm with a proximal end, a distal end and a longitudinal axis, and at least one force arm with a proximal end, a distal end and longitudinal axis, said proximal ends of said at least one guide arm and said at least one force arm are pivotally connected to said base and their longitudinal axes converge and their distal ends are pivotally connected together to form a common pivot joint configured to pivotally connect said boom supporting member, said longitudinal axes of said at least one guide arm and said at least one force arm being perpendicularly aligned, said at least one guide arm also being aligned so that said longitudinal axis of said at least one guide arm when extended from said proximal end of said at least one guide arm passes through said boom pivot joint; and
   c. a strain gauge attached to said at least one force arm configured to measure strain on said at least one force arm.

6. The lifting bracket, as recited in claim 5, further including a yoke configured to be attached to said common pivot joint and said boom supporting member.

7. The lift bracket as recited in claim 5, wherein the least one guide arm includes two parallel guide arms and the at least one force arm includes one force arm.

8. An anti-tip system for a lifting machine that includes a chassis, a boom pivotally connected to the chassis at a boom pivot joint, and a boom supporting member; wherein a distal end of the boom supporting member is pivotally attached to the boom; the system comprising:
   a. at least one guide arm pivotally coupled at one end to said chassis and a force arm pivotally coupled at one end to said chassis, each said at least one guide arm and said force arm includes a distal end and a longitudinal axis, said at least one guide arm and said force arm being aligned on said chassis so their distal ends are pivotally coupled together to form a common pivot joint and the longitudinal axis of said force arm is perpendicularly aligned with said longitudinal axis of said at least one guide arm, said at least one guide arm being oriented on said chassis so said longitudinal axis of the at least one guide arm when extended passes through said boom pivot joint, said force arm being pivotally coupled to said boom supporting member;
   b. a strain gauge coupled to said force arm, said strain gauge configured to measure stress exerted on said force arm by said boom supporting member;
   c. a printed circuit board with a microprocessor, said printed circuit board configured to receive stress measurements from said strain gauge; and
   d. a software program loaded into said microprocessor configured to calculate load forces exerted on said boom when lifting a load using the stress measured by said strain gauge.

9. The lifting bracket, as recited in claim 8, further including a yoke configured to attach said common pivot joint to said boom supporting member.

* * * * *